(12) United States Patent
Fujii et al.

(10) Patent No.: US 11,274,744 B2
(45) Date of Patent: Mar. 15, 2022

(54) FAULT EVALUATION DEVICE FOR AUTOMATIC TRANSMISSION, FAULT EVALUATION METHOD FOR AUTOMATIC TRANSMISSION, AND NON-TRANSITORY STORAGE MEDIUM STORING FAULT EVALUATION PROGRAM FOR AUTOMATIC TRANSMISSION

(71) Applicant: TOYOTA JIDOSHA KABUSHIKI KAISHA, Toyota (JP)

(72) Inventors: Kota Fujii, Nisshin (JP); Atsushi Tabata, Okazaki (JP); Koichi Okuda, Toyota (JP); Ken Imamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/339,476

(22) Filed: Jun. 4, 2021

(65) Prior Publication Data

US 2021/0404551 A1 Dec. 30, 2021

(30) Foreign Application Priority Data

Jun. 24, 2020 (JP) .............................. JP2020-109012

(51) Int. Cl.
*F16H 61/12* (2010.01)
*B60K 6/365* (2007.10)
*B60K 6/547* (2007.10)
*F16H 61/30* (2006.01)

(52) U.S. Cl.
CPC .............. *F16H 61/12* (2013.01); *B60K 6/365* (2013.01); *B60K 6/547* (2013.01); *B60Y 2200/92* (2013.01); *F16H 61/30* (2013.01); *F16H 2061/1216* (2013.01); *F16H 2200/0043* (2013.01); *F16H 2200/2007* (2013.01);
(Continued)

(58) Field of Classification Search
None
See application file for complete search history.

(56) References Cited

U.S. PATENT DOCUMENTS

2008/0300081 A1* 12/2008 Meitin .................... F16H 47/08
475/36
2012/0152056 A1* 6/2012 Du ........................ F16H 61/448
74/731.1
(Continued)

FOREIGN PATENT DOCUMENTS

WO 2012/111192 A1 8/2012

*Primary Examiner* — Colby M Hansen
(74) *Attorney, Agent, or Firm* — Oliff PLC

(57) ABSTRACT

A fault evaluation device for an automatic transmission evaluates a fault of the automatic transmission. The fault evaluation device is used for a vehicle having the automatic transmission and a control device configured to execute a learning process for correcting a target pressure for oil to be supplied to the automatic transmission such that variations in acceleration of the vehicle during shifting of the automatic transmission are small. The fault evaluation device includes a processor and a memory. The memory stores mapping data that prescribe mapping. The processor is configured to output an output variable, which is an evaluation value that indicates the presence or absence of the fault of the automatic transmission, when an input variable is input.

14 Claims, 5 Drawing Sheets

(52) U.S. Cl.
CPC ........... *F16H 2200/2041* (2013.01); *F16H 2200/2066* (2013.01); *F16H 2200/2082* (2013.01)

(56) References Cited

U.S. PATENT DOCUMENTS

| | | | |
|---|---|---|---|
| 2013/0281244 A1* | 10/2013 | Vaughn | F16H 47/04 475/72 |
| 2013/0319099 A1 | 12/2013 | Kishino et al. | |
| 2016/0131229 A1* | 5/2016 | Hehenberger | F16H 3/72 475/80 |
| 2018/0149247 A1* | 5/2018 | Rekow | F16H 47/04 |

* cited by examiner

|  | C1 | C2 | B1 | B2 | F1 |
|---|---|---|---|---|---|
| 1st | ○ |  |  | (○) | ○ |
| 2nd | ○ |  | ○ |  |  |
| 3rd | ○ | ○ |  |  |  |
| 4th |  | ○ | ○ |  |  |
| R | ○ |  |  | ○ |  |

FAULT EVALUATION DEVICE FOR AUTOMATIC TRANSMISSION, FAULT EVALUATION METHOD FOR AUTOMATIC TRANSMISSION, AND NON-TRANSITORY STORAGE MEDIUM STORING FAULT EVALUATION PROGRAM FOR AUTOMATIC TRANSMISSION

CROSS-REFERENCE TO RELATED APPLICATION

This application claims priority to Japanese Patent Application No. 2020-109012 filed on Jun. 24, 2020, incorporated herein by reference in its entirety.

BACKGROUND

1. Technical Field

The present disclosure relates to a fault evaluation device for an automatic transmission, a fault evaluation method for an automatic transmission, and a non-transitory storage medium that stores a fault evaluation program for an automatic transmission.

2. Description of Related Art

WO 2012/111192 describes a vehicle including an evaluation device that evaluates a shifting shock in an automatic transmission. The evaluation device acquires acceleration from an acceleration sensor. The evaluation device evaluates a shifting shock in the automatic transmission based on transition in the acceleration from the start until the completion of shifting of the automatic transmission.

SUMMARY

The magnitude of a shifting shock in the automatic transmission may vary in accordance with not only the presence or absence of a fault of the automatic transmission but also other various factors. Therefore, even when the evaluation device described in WO 2012/111192 evaluates a shifting shock as being large, there is a considerable possibility that the large shifting shock is not due to a fault of the automatic transmission. That is, the evaluation device described in WO 2012/111192 has room for improvement for the evaluation of the presence or absence of a failure of an automatic transmission.

A first aspect of the present disclosure provides a fault evaluation device for an automatic transmission, the fault evaluation device evaluating a fault of the automatic transmission, and the fault evaluation device being used for a vehicle having the automatic transmission and a control device configured to execute a learning process for correcting a target pressure for oil to be supplied to the automatic transmission such that variations in acceleration of the vehicle during shifting of the automatic transmission are small. The fault evaluation device includes a processor and a memory. The memory stores mapping data that prescribe mapping. The processor is configured to output an output variable, which is an evaluation value that indicates presence or absence of the fault of the automatic transmission, when an input variable is input. The mapping includes, as the input variable, an acceleration variable, which is a variable that indicates the acceleration of the vehicle during shifting of the automatic transmission, and a learning progress variable, which is a variable that indicates a status of progress of learning in the learning process. The processor is configured to execute an acquisition process, which is a process to acquire the input variable, and a calculation process, which is a process to calculate a value of the output variable by inputting the input variable acquired through the acquisition process to the mapping.

With the configuration described above, the processor outputs an output variable, which is an evaluation value that indicates the presence or absence of the fault, in consideration of not only the acceleration of the vehicle during shifting of the automatic transmission but also the status of progress of the learning process for the target pressure for oil. Thus, an evaluation value indicating that no fault is caused in the automatic transmission can be output even when the acceleration during shifting becomes large because the learning process has not fully progressed yet, for example. That is, with the configuration described above, the presence or absence of the fault of the automatic transmission can be evaluated accurately irrespective of the status of progress of the learning process.

In the aspect described above, the learning progress variable may be a variable that takes a first value when the learning in the learning process has converged, and that takes a second value, which is different from the first value, when the learning in the learning process has not converged.

With the configuration described above, it is possible to obtain an evaluation value determined in consideration of whether learning has converged and the variations in the acceleration during shifting are relatively large or learning has not converged and the variations in the acceleration during shifting are relatively large. Thus, the fault of the automatic transmission can be evaluated accurately.

In the aspect described above, the learning progress variable may be a variable that indicates the number of times of execution of the learning process since the automatic transmission was mounted on the vehicle. In the above configuration, the number of times of execution of the learning process, which is a value strongly correlated with the degree of progress of the learning process, is input as an input variable. Therefore, an evaluation value that accurately reflects the degree of progress of the learning process can be obtained.

In the aspect described above, the learning progress variable may be a travel distance of the vehicle that has been traveled since the automatic transmission was mounted on the vehicle. In the above configuration, the travel distance of the vehicle, which is a value strongly correlated with the degree of progress of the learning process, is input as an input variable. Therefore, an evaluation value that accurately reflects the progress of the learning process can be obtained.

In the aspect described above, the target pressure may be calculated by adding or multiplying a learning correction value and a reference pressure which is a pressure of oil at a time when the learning process has not been performed yet; the learning process may be a process to calculate the learning correction value such that the variations in the acceleration of the vehicle during shifting of the automatic transmission are small; and the mapping may include the learning correction value as the input variable.

In the aspect described above, the absolute value of the learning correction value tends to be small when degradation etc. of the automatic transmission has not progressed, and to be large when degradation etc. of the automatic transmission has progressed. The presence or absence of the fault of the automatic transmission can be evaluated accurately by inputting a value that may reflect degradation etc. of the automatic transmission in this manner.

In the aspect described above, the automatic transmission may include a plurality of engagement elements and a plurality of gear stages operated by the engagement elements; and the mapping may include, as the input variable, a shifting type variable which indicates a type of the gear stages before and after shifting of the automatic transmission.

In the aspect described above, the ease of variation in the acceleration during shifting differs in accordance with the type of gear stages before and after shifting of the automatic transmission. With the configuration described above, the input variable includes a shifting type variable which indicates the type of gear stages before and after shifting of the automatic transmission, and thus the fault can be evaluated accurately in accordance with the type of gear stages.

In the aspect described above, the automatic transmission may include the engagement elements and the gear stages operated by the engagement elements; and the mapping may include, as the input variable, a variable indicating the number of times of shifting which indicates the number of times of shifting made since the automatic transmission was mounted on the vehicle, the number of times of shifting being made to one of the gear stages after shifting of the automatic transmission.

In the above aspect, the number of times of shifting made to the one of the gear stages after shifting of the automatic transmission, which is a value strongly correlated with the degree of wear of the automatic transmission, is input as an input variable. The presence or absence of the fault of the automatic transmission can be evaluated accurately by inputting a value that may reflect the degree of wear of the automatic transmission in this manner.

In the aspect described above, the automatic transmission may include the engagement elements and the gear stages operated by the engagement elements; and the mapping may include, as the input variable, a variable indicating the number of times of engagement which indicates the number of times of engagement made by the engagement elements since the automatic transmission was mounted on the vehicle, the number of times of engagement being made by an engagement element, among the engagement elements, that is engaged to establish one of the gear stages after shifting of the automatic transmission.

In the above configuration, the number of times of engagement made by the engagement element that is engaged to establish the one of the gear stages after shifting of the automatic transmission, which is a value strongly correlated with the degree of wear of the automatic transmission, is input as an input variable. The presence or absence of the fault of the automatic transmission can be evaluated accurately by inputting a value that may reflect the degree of wear of the automatic transmission in this manner.

In the aspect described above, the mapping may include, as the input variable, an accelerator variable which indicates an amount of operation of an accelerator pedal during shifting of the automatic transmission. In the above configuration, the variations in the acceleration during shifting of the automatic transmission differ, depending on the amount of operation of the accelerator pedal, even if the other conditions are the same. With the configuration described above, a value that indicates the amount of operation of the accelerator pedal is input, and thus an evaluation value that reflects the amount of operation of the accelerator pedal can be obtained.

A second aspect of the present disclosure provides a fault evaluation device for an automatic transmission, the fault evaluation device evaluating a fault of the automatic transmission, and the fault evaluation device being used for a vehicle having the automatic transmission and a control device configured to execute a learning process for correcting a target pressure for oil to be supplied to the automatic transmission such that variations in acceleration of the vehicle during shifting of the automatic transmission are small. The fault evaluation device includes a processor and a memory. The memory stores mapping data that prescribe first mapping and second mapping. The processor is configured to output an output variable, which is an evaluation value that indicates presence or absence of the fault of the automatic transmission, when a plurality of input variables is input. The first mapping and the second mapping includes, as one of the input variables, an acceleration variable which is a variable that indicates the acceleration of the vehicle during shifting of the automatic transmission; the first mapping is trained mapping that has been trained through machine learning on condition that a learning progress variable, which is a variable that indicates a status of progress of learning in the learning process, is within a first range; the second mapping is trained mapping that has been trained through machine learning on condition that the learning progress variable is within a second range which is different from the first range; and the processor is configured to execute an acquisition process, which is a process to acquire the input variables and the learning progress variable, a first calculation process to calculate a value of the output variable by inputting the input variables acquired through the acquisition process to the first mapping when the learning progress variable acquired through the acquisition process is within the first range, and a second calculation process to calculate the value of the output variable by inputting the input variables acquired through the acquisition process to the second mapping when the learning progress variable acquired through the acquisition process is within the second range.

With the configuration described above, one of the first mapping and the second mapping is selectively used in accordance with the learning progress variable which is a variable that indicates the status of progress of learning in the learning process. Consequently, an appropriate value can be output as an output variable which is an evaluation value that indicates the presence or absence of the fault, irrespective of the status of progress of the learning process. That is, with the configuration described above, the presence or absence of the fault of the automatic transmission can be evaluated accurately irrespective of the status of progress of the learning process.

A third aspect of the present disclosure provides a fault evaluation method for an automatic transmission, the fault evaluation method being used to evaluate a fault of the automatic transmission, and the fault evaluation method being used for a vehicle having the automatic transmission and a control device configured to execute a learning process for correcting a target pressure for oil to be supplied to the automatic transmission such that variations in acceleration of the vehicle during shifting of the automatic transmission are small. The fault evaluation method is executed by a fault evaluation device. The fault evaluation device includes a processor and a memory. The memory stores mapping data that prescribe mapping. The processor is configured to output an output variable, which is an evaluation value that indicates presence or absence of the fault of the automatic transmission, when an input variable is input. The fault evaluation method includes calculating a value of the output variable by inputting, as the input variable, an acceleration variable, which is a variable that indicates the acceleration of the vehicle during shifting of the automatic transmission, and a learning progress variable, which is a variable that indicates a status of progress of learning in the learning process, to the fault evaluation device.

With the configuration described above, the processor outputs an output variable, which is an evaluation value that indicates the presence or absence of the fault, in consideration of not only the acceleration of the vehicle during shifting of the automatic transmission but also the status of progress of the learning process for the target pressure for oil. Thus, an evaluation value indicating that no fault is caused in the automatic transmission can be output even when the acceleration during shifting becomes large because the learning process has not fully progressed yet, for example. That is, with the configuration described above, the presence or absence of the fault of the automatic transmission can be evaluated accurately irrespective of the status of progress of the learning process.

A fourth aspect of the present disclosure provides a fault evaluation method for an automatic transmission, the fault evaluation method being used to evaluate a fault of the automatic transmission, and the fault evaluation method being used for a vehicle having the automatic transmission and a control device configured to execute a learning process for correcting a target pressure for oil to be supplied to the automatic transmission such that variations in acceleration of the vehicle during shifting of the automatic transmission are small. The fault evaluation method is executed by a fault evaluation device. The fault evaluation device includes a processor and a memory. The memory stores mapping data that prescribe first mapping and second mapping. The processor is configured to output an output variable, which is an evaluation value that indicates presence or absence of the fault of the automatic transmission, when a plurality of input variables is input. The first mapping and the second mapping include, as one of the input variables, an acceleration variable which is a variable that indicates the acceleration of the vehicle during shifting of the automatic transmission. The first mapping is trained mapping that has been trained through machine learning on condition that a learning progress variable, which is a variable that indicates a status of progress of learning in the learning process, is within a first range. The second mapping is trained mapping that has been trained through machine learning on condition that the learning progress variable is within a second range which is different from the first range. The fault evaluation method includes: inputting, as the input variables, the acceleration variable and the learning progress variable to the fault evaluation device; and calculating a value of the output variable by inputting the input variables to the first mapping when the learning progress variable is within the first range, and calculating the value of the output variable by inputting the input variables to the second mapping when the learning progress variable is within the second range.

With the configuration described above, one of the first mapping and the second mapping is selectively used in accordance with the learning progress variable which is a variable that indicates the status of progress of learning in the learning process. Consequently, an appropriate value can be output as an output variable which is an evaluation value that indicates the presence or absence of the fault, irrespective of the status of progress of the learning process. That is, with the configuration described above, the presence or absence of the fault of the automatic transmission can be evaluated accurately irrespective of the status of progress of the learning process.

A fifth aspect of the present disclosure provides a non-transitory storage medium that stores a fault evaluation program for an automatic transmission, the fault evaluation program being configured to cause a computer to operate as a fault evaluation device that evaluates a fault of the automatic transmission. The fault evaluation program is used for a vehicle having the automatic transmission and a control device configured to execute a learning process for correcting a target pressure for oil to be supplied to the automatic transmission such that variations in acceleration of the vehicle during shifting of the automatic transmission are small. The fault evaluation program has mapping data that prescribe mapping. The mapping includes, as an input variable, an acceleration variable, which is a variable that indicates the acceleration of the vehicle during shifting of the automatic transmission, and a learning progress variable, which is a variable that indicates a status of progress of learning in the learning process. The fault evaluation program is configured to cause the computer to execute a function to acquire the input variable and a function to calculate a value of an output variable, which is an evaluation value that indicates presence or absence of the fault of the automatic transmission, by inputting the acquired input variable to the mapping.

With the configuration described above, the processor outputs an output variable, which is an evaluation value that indicates the presence or absence of the fault, in consideration of not only the acceleration of the vehicle during shifting of the automatic transmission but also the status of progress of the learning process for the target pressure for oil. Thus, an evaluation value indicating that no fault is caused in the automatic transmission can be output even when the acceleration during shifting becomes large because the learning process has not fully progressed yet, for example. That is, with the configuration described above, the presence or absence of the fault of the automatic transmission can be evaluated accurately irrespective of the status of progress of the learning process.

A sixth aspect of the present disclosure provides a non-transitory storage medium that stores a fault evaluation program for an automatic transmission, the fault evaluation program being configured to cause a computer to operate as a fault evaluation device that evaluates a fault of the automatic transmission. The fault evaluation program is used for a vehicle having the automatic transmission and a control device configured to execute a learning process for correcting a target pressure for oil to be supplied to the automatic transmission such that variations in acceleration of the vehicle during shifting of the automatic transmission are small. The fault evaluation program has mapping data that prescribe first mapping and second mapping. The first mapping and the second mapping include, as one of a plurality of input variables, an acceleration variable which is a variable that indicates the acceleration of the vehicle during shifting of the automatic transmission. The first mapping is trained mapping that has been trained through machine learning on condition that a learning progress variable, which is a variable that indicates a status of progress of learning in the learning process, is within a first range. The second mapping is trained mapping that has been trained through machine learning on condition that the learning progress variable is within a second range which is different from the first range. The fault evaluation program is configured to cause the computer to execute a function to acquire the input variables and the learning progress variable, a function to calculate a value of an output variable, which is an evaluation value that indicates presence or absence of the fault of the automatic transmission, by inputting the acquired input variables to the first mapping when the acquired learning progress variable is within the first range, and a function to calculate the value of the output variable by inputting the acquired input variables to the second mapping when the acquired learning progress variable is within the second range.

With the configuration described above, one of the first mapping and the second mapping is selectively used in accordance with the learning progress variable which is a variable that indicates the status of progress of learning in the learning process. Consequently, an appropriate value can be output as an output variable which is an evaluation value that indicates the presence or absence of the fault, irrespective of the status of progress of the learning process. That is, with the configuration described above, the presence or absence of the fault of the automatic transmission can be evaluated accurately irrespective of the status of progress of the learning process.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

A first embodiment of the present disclosure will be described below with reference to FIGS. 1 to 4. First, a schematic configuration of a vehicle 100 will be described.

Figures 1, 2:
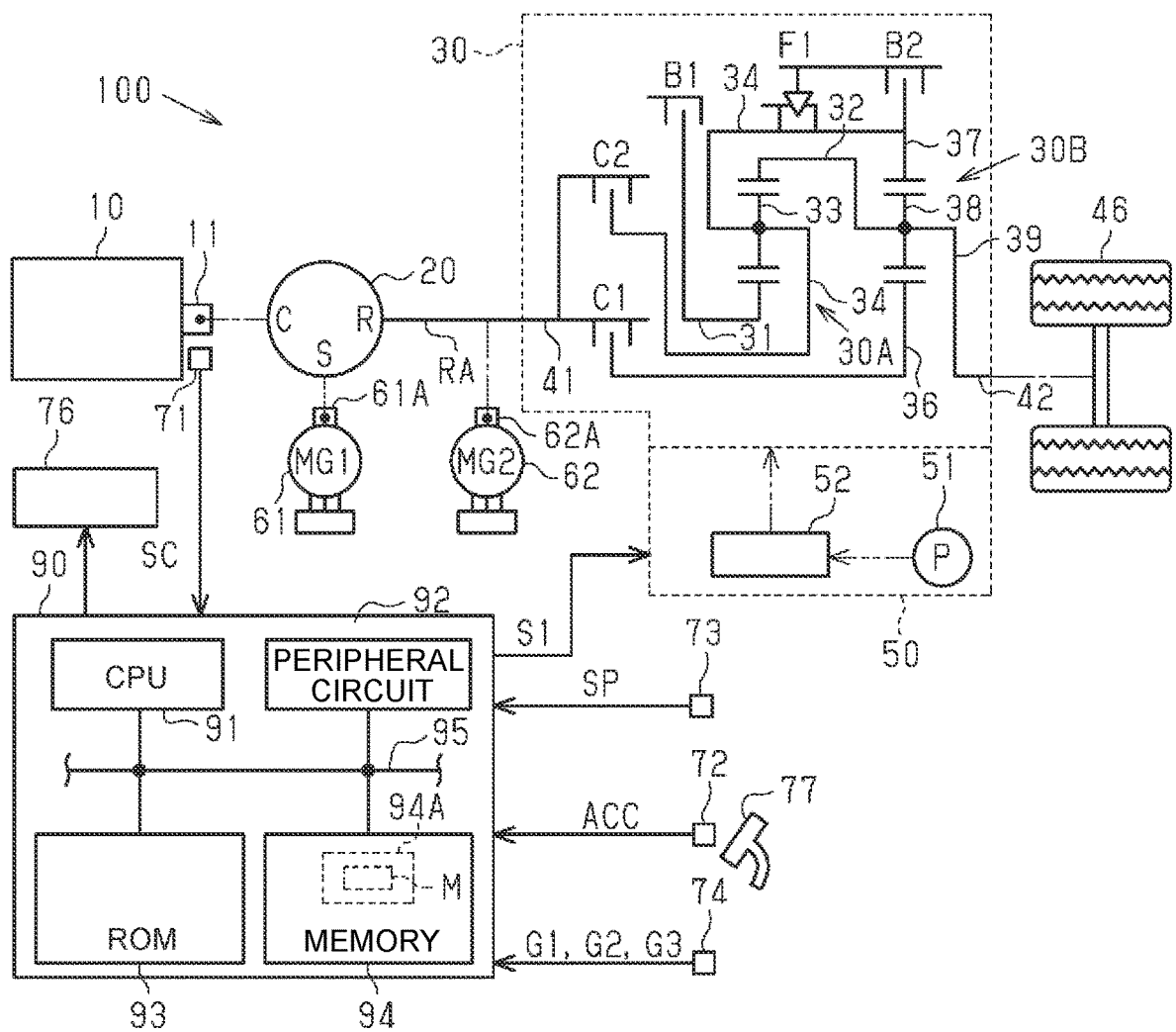
FIG. 1 is a schematic diagram of a vehicle according to a first embodiment.
FIG. 2 illustrates the relationship between gear stages and engagement elements in an automatic transmission according to the embodiment.

As illustrated in FIG. 1, the vehicle 100 includes an internal combustion engine 10, a power split device 20, an automatic transmission 30, drive wheels 46, a hydraulic device 50, a first motor/generator 61, and a second motor/generator 62.

The power split device 20 is coupled to a crankshaft 11 which is an output shaft of the internal combustion engine 10. The power split device 20 is a planetary gear mechanism that has a sun gear S, a ring gear R, and a carrier C. The crankshaft 11 is coupled to the carrier C of the power split device 20. A rotary shaft 61A of the first motor/generator 61 is coupled to the sun gear S. A rotary shaft 62A of the second motor/generator 62 is coupled to a ring gear shaft RA which is an output shaft of the ring gear R. An input shaft 41 of the automatic transmission 30 is also coupled to the ring gear shaft RA. The right and left drive wheels 46 are coupled to an output shaft 42 of the automatic transmission 30 via a differential gear (not illustrated).

When the internal combustion engine 10 is driven and torque is input from the crankshaft 11 to the carrier C of the power split device 20, the torque is split to the side of the sun gear S and the side of the ring gear R. When the first motor/generator 61 operates as a motor and torque is input to the sun gear S of the power split device 20, the torque is split to the side of the carrier C and the side of the ring gear R.

When the second motor/generator 62 operates as a motor and torque is input to the ring gear shaft RA, the torque is transferred to the automatic transmission 30. When torque from the side of the drive wheels 46 is input to the second motor/generator 62 via the ring gear shaft RA, the second motor/generator 62 functions as an electric generator, and can generate a regenerative braking force for the vehicle 100.

The automatic transmission 30 includes a first planetary gear mechanism 30A, a second planetary gear mechanism 30B, a first clutch C1, a second clutch C2, a first brake mechanism B1, a second brake mechanism B2, and a one-way clutch F1.

Further, the first planetary gear mechanism 30A includes a sun gear 31, a ring gear 32, a pinion gear 33, and a carrier 34. The ring gear 32 is coupled to the sun gear 31 via the pinion gear 33. The pinion gear 33 is supported by the carrier 34.

The sun gear 31 is coupled to the first brake mechanism B1. The first brake mechanism B1 can be switched between an engaged state and a disengaged state in accordance with the pressure of oil supplied to the first brake mechanism B1. Specifically, the first brake mechanism B1 is switched from the disengaged state to the engaged state when the pressure of oil supplied to the first brake mechanism B1 becomes high. Rotation of the sun gear 31 is braked when the first brake mechanism B1 is in the engaged state.

The one-way clutch F1 is coupled to the carrier 34. The one-way clutch F1 regulates rotation of the carrier 34 toward one side while permitting rotation thereof toward the other side. That is, the one-way clutch F1 is switched between a regulated state, in which rotation of the carrier 34 is regulated, and a permitted state, in which rotation of the carrier 34 is permitted. The carrier 34 is coupled to the second brake mechanism B2. As with the first brake mechanism B1, the second brake mechanism B2 can be switched between an engaged state and a disengaged state in accordance with the pressure of oil supplied to the second brake mechanism B2. Rotation of the carrier 34 is braked when the second brake mechanism B2 is in the engaged state.

The second planetary gear mechanism 30B includes a sun gear 36, a ring gear 37, a pinion gear 38, and a carrier 39. The ring gear 37 is coupled to the sun gear 36 via the pinion gear 38. The pinion gear 38 is supported by the carrier 39. The output shaft 42 is coupled to the carrier 39.

In each of the planetary gear mechanisms configured as described above, the carrier 34 of the first planetary gear mechanism 30A is coupled to the ring gear 37 of the second planetary gear mechanism 30B. The ring gear 32 of the first planetary gear mechanism 30A is coupled to the carrier 39 of the second planetary gear mechanism 30B.

The sun gear 36 of the second planetary gear mechanism 30B is coupled to the input shaft 41 via the first clutch C1. The first clutch C1 can be switched between an engaged state and a disengaged state in accordance with the pressure of oil supplied to the first clutch C1. Specifically, the first clutch C1 is switched from the disengaged state to the engaged state when the pressure of oil supplied to the first clutch C1 becomes high. The sun gear 36 of the second planetary gear mechanism 30B rotates together with the input shaft 41 when the first clutch C1 is in the engaged state.

The carrier 34 of the first planetary gear mechanism 30A is coupled to the input shaft 41 via the second clutch C2. As with the first clutch C1, the second clutch C2 can be switched between an engaged state and a disengaged state in accordance with the pressure of oil supplied to the second clutch C2. The carrier 34 of the first planetary gear mechanism 30A rotates together with the input shaft 41 when the second clutch C2 is in the engaged state. In the present embodiment, each of the first clutch C1, the second clutch C2, the first brake mechanism B1, and the second brake mechanism B2 is an engagement element.

In the automatic transmission 30, as illustrated in FIG. 2, gear stages are switched in accordance with the combination of the engaged state and the disengaged state of the first clutch C1, the second clutch C2, the first brake mechanism B1, and the second brake mechanism B2 and the combination of the regulated state and the permitted state of the one-way clutch F1. The automatic transmission 30 can establish a total of five gear stages including four gear stages, namely "first gear" to "fourth gear", for forward travel and one gear stage, namely "R", for reverse travel.

In FIG. 2, the symbol "○" indicates that the engagement element such as the first clutch C1 is in the engaged state or that the one-way clutch F1 is in the regulated state. The symbol "(○)" indicates that the engagement element such as the first clutch C1 is in the engaged state or the disengaged state. The blank indicates that the engagement element such as the first clutch C1 is in the disengaged state or that the one-way clutch F1 is in the permitted state. When the gear stage of the automatic transmission 30 is second gear, for example, the first clutch C1 and the first brake mechanism B1 are in the engaged state, the second clutch C2 and the second brake mechanism B2 are in the disengaged state, and the one-way clutch F1 is in the permitted state.

The hydraulic device 50 is mounted on the vehicle 100. The hydraulic device 50 includes an oil pump 51 and a hydraulic circuit 52 through which oil from the oil pump 51 flows. The oil pump 51 is a so-called mechanical oil pump that operates upon receiving torque of the crankshaft 11. The hydraulic circuit 52 includes a plurality of solenoid valves (not illustrated). The hydraulic circuit 52 regulates the pressure of oil to be supplied to the first clutch C1, the second clutch C2, the first brake mechanism B1, and the second brake mechanism B2 by controlling the solenoid valves. That is, in the present embodiment, the engaged state and the disengaged state of the engagement elements such as the first clutch C1 are controlled using the pressure of oil by controlling the solenoid valves of the hydraulic circuit 52.

The vehicle 100 includes, as mounted thereon, a crank angle sensor 71, an accelerator position sensor 72, a vehicle speed sensor 73, an acceleration sensor 74, an indication unit 76, and an accelerator pedal 77. The crank angle sensor 71 detects a crank angle SC which is the rotational angle of the crankshaft 11. The accelerator position sensor 72 detects an accelerator operation amount ACC which is the amount of operation of the accelerator pedal 77 which is operated by a driver. The vehicle speed sensor 73 detects a vehicle speed SP which is the speed of the vehicle 100. The acceleration sensor 74 is a so-called triaxial sensor that detects a front-rear acceleration G1 which is the acceleration of the vehicle 100 in the front-rear direction, a vehicle width acceleration G2 which is the acceleration of the vehicle 100 in the width direction, and an up-down acceleration G3 which is the acceleration of the vehicle 100 in the up-down direction. The acceleration sensor 74 detects the front-rear acceleration G1, the vehicle width acceleration G2, and the up-down acceleration G3. The indication unit 76 indicates visual information to the driver etc. of the vehicle 100. Examples of the indication unit 76 include an indicator lamp.

The vehicle 100 includes a control device 90. The control device 90 receives signals that indicate the crank angle SC, the accelerator operation amount ACC, and the vehicle speed SP input from the crank angle sensor 71, the accelerator position sensor 72, and the vehicle speed sensor 73, respectively. The control device 90 receives a signal that indicates the front-rear acceleration G1, the vehicle width acceleration G2, and the up-down acceleration G3 input from the acceleration sensor 74. The control device 90 calculates an engine rotational speed NE, which is the rotational speed of the crankshaft 11 per unit time, based on the crank angle SC.

The control device 90 includes a central processing unit (CPU) 91, a peripheral circuit 92, a read only memory (ROM) 93, and a memory 94. The CPU 91, the peripheral circuit 92, the ROM 93, and the memory 94 are communicably connected to each other through a bus 95. The ROM 93 stores various types of programs in advance in order for the CPU 91 to execute various kinds of control. The memory 94 stores mapping data 94A, to be discussed later, in advance. The memory 94 stores data including the accelerator operation amount ACC, the vehicle speed SP, the front-rear acceleration G1, the vehicle width acceleration G2, the up-down acceleration G3, and the engine rotational speed NE input to the control device 90 over a certain period. The peripheral circuit 92 includes a circuit that generates a clock signal that prescribes internal operation, a power source circuit, a reset circuit, etc. In the present embodiment, the CPU 91 and the ROM 93 serve as the processor. The memory 94 serves as the memory. The control device 90 functions as a fault evaluation device that evaluates a fault of the automatic transmission 30.

The CPU 91 controls the internal combustion engine 10, the first motor/generator 61, the second motor/generator 62, the automatic transmission 30, etc. by executing the various kinds of programs stored in the ROM 93. Specifically, the CPU 91 calculates vehicle required output, which is a required value of output that is necessary for the vehicle 100 to travel, based on the accelerator operation amount ACC and the vehicle speed SP. The CPU 91 determines the distribution of torque to the internal combustion engine 10, the first motor/generator 61, and the second motor/generator 62 based on the vehicle required output. The CPU 91 controls output of the internal combustion engine 10 and power running and regeneration of the first motor/generator 61 and the second motor/generator 62 based on the distribution of torque to the internal combustion engine 10, the first motor/generator 61, and the second motor/generator 62.

The CPU 91 calculates a target gear stage, which is a gear stage as a target for the automatic transmission 30, based on the vehicle speed SP and the vehicle required output. The CPU 91 calculates a target pressure Z, which is a target value for the pressure of oil to be supplied to the first clutch C1, the second clutch C2, the first brake mechanism B1, and the second brake mechanism B2, based on the target gear stage. Then, the CPU 91 outputs a control signal 51 to the hydraulic device 50 based on the target pressure Z. The hydraulic device 50 changes the pressure of oil to be supplied to the first clutch C1, the second clutch C2, the first brake mechanism B1, and the second brake mechanism B2 based on the control signal 51. As illustrated in FIG. 2, when the gear stage of the automatic transmission 30 before a change is second gear, for example, the first clutch C1 and the first brake mechanism B1 are in the engaged state, the second clutch C2 and the second brake mechanism B2 are in the disengaged state, and the one-way clutch F1 is in the permitted state. When the target gear stage for the automatic transmission 30 is set to third gear, the second clutch C2 is brought from the disengaged state to the engaged state by gradually raising the pressure of oil supplied from the hydraulic device 50 to the second clutch C2 in accordance with the control signal S1 which is based on the target pressure Z for the second clutch C2. On the other hand, the first brake mechanism B1 is brought from the engaged state to the disengaged state by gradually lowering the pressure of oil supplied from the hydraulic device 50 to the first brake mechanism B1 in accordance with the control signal S1 which is based on the target pressure Z for the first brake mechanism B1. As a result, the gear stage of the automatic transmission 30 is changed from second gear to third gear.

Next, learning control performed by the CPU 91 during shifting of the automatic transmission 30 will be described. The CPU 91 executes the learning control repeatedly in a predetermined cycle from the start of shifting of the automatic transmission 30 until the end of the shifting of the automatic transmission 30. The ROM 93 stores in advance a learning program which is a program for the learning control. The CPU 91 performs the learning control by executing the learning program stored in the ROM 93.

Figure 3:
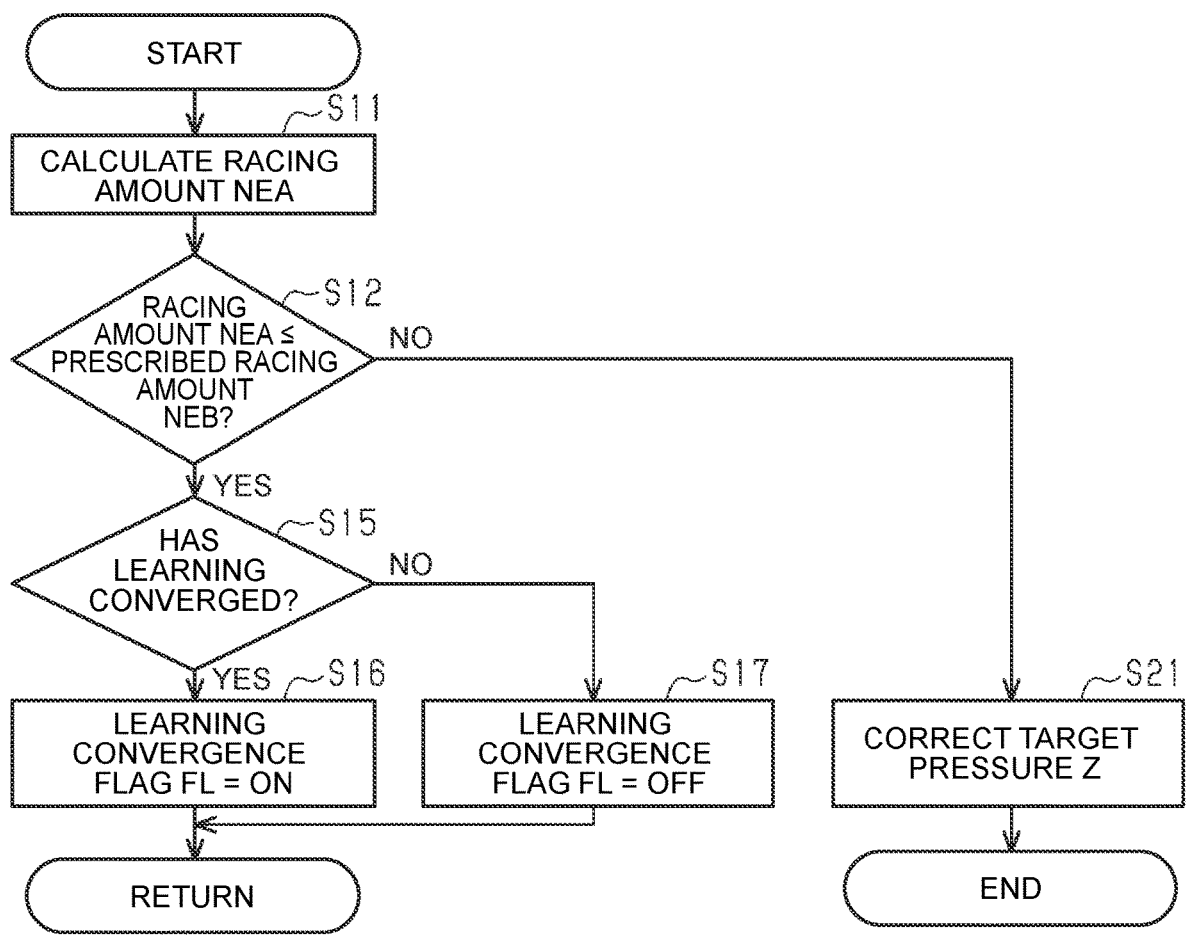
FIG. 3 is a flowchart illustrating learning control according to the embodiment.

As illustrated in FIG. 3, when the learning control is started, the CPU 91 calculates a racing amount NEA of the engine rotational speed NE in step S11. The value of total torque obtained by summing up torque that can be transferred by an engagement element maintained in the engaged state, torque that can be transferred by an engagement element brought from the disengaged state to the engaged state, and torque that can be transferred by an engagement element brought from the engaged state to the disengaged state during shifting of the automatic transmission 30 is used as the value of torque that can be transferred. The value of torque that can be transferred occasionally temporarily becomes small compared to the value of torque desired to be transferred from the input shaft 41 to the output shaft 42. In this case, the engine rotational speed NE temporarily becomes high. The engine rotational speed NE returns to the original state when the difference between the value of torque that can be transferred and the value of torque desired to be transferred becomes small. Thus, it is possible to determine that the value of torque that can be transferred is small compared to the value of torque desired to be transferred, based on a phenomenon that the engine rotational speed NE temporarily becomes high, or so-called racing of the internal combustion engine 10. Thus, in step S11, the CPU 91 acquires the engine rotational speed NE for a certain period determined in advance from the time when step S11 is performed. Then, the CPU 91 calculates the racing amount NEA which is a value obtained by subtracting the smallest value of the acquired engine rotational speeds NE from the largest value thereof. The memory 94 stores the engine rotational speed NE for the certain period determined in advance from the time when step S11 is performed. After that, the CPU 91 proceeds to the process in step S12.

In step S12, the CPU 91 determines whether the racing amount NEA is equal to or less than a prescribed racing amount NEB determined in advance. The prescribed racing amount NEB is set in advance as a value for detecting the racing amount NEA which is larger than a certain value. When it is determined in step S12 that the racing amount NEA is larger than the prescribed racing amount NEB (S12: NO), the CPU 91 proceeds to the process in step S21.

In step S21, the CPU 91 corrects the target pressure Z for an engagement element operated from the disengaged state to the engaged state. The target pressure Z is calculated by adding a learning correction value CVL to a reference pressure ZA determined in advance. The reference pressure ZA is set in advance during manufacture of the automatic transmission 30 for each of the first clutch C1, the second clutch C2, the first brake mechanism B1, and the second brake mechanism B2. In step S21, the CPU 91 changes the learning correction value CVL for an engagement element operated from the disengaged state to the engaged state. Specifically, the CPU 91 calculates a new learning correction value CVL by adding a predetermined value determined in advance to the learning correction value CVL before the process in step S21. As a result, the target pressure Z for an engagement element operated from the disengaged state to the engaged state is corrected. The initial value of the learning correction value CVL for the target engagement element at the time when the process in step S21 has not been performed yet is "0".

As illustrated in FIG. 2, when the gear stage of the automatic transmission 30 is changed from second gear to third gear, for example, the second clutch C2 is operated from the disengaged state to the engaged state. In this case, the target pressure Z for the second clutch C2 is corrected by changing the learning correction value CVL for the second clutch C2. After that, the CPU 91 finishes the learning control performed during the current shifting of the automatic transmission 30.

In the present embodiment, a temporary rise in the engine rotational speed NE is suppressed by repeatedly performing the process in step S21. The occurrence of a shock caused in the vehicle 100 along with shifting of the automatic transmission 30, or a so-called shifting shock, due to a temporary rise in the engine rotational speed NE is suppressed. As a result, variations in the acceleration of the vehicle 100 during shifting of the automatic transmission 30 are reduced. That is, the process in step S21 is the learning process for correcting the target pressure Z for oil to be supplied to the automatic transmission 30 such that variations in the acceleration of the vehicle 100 during shifting of the automatic transmission 30 are small.

When it is determined in step S12 that the racing amount NEA is equal to or less than the prescribed racing amount NEB (S12: YES), on the other hand, the CPU 91 proceeds to step S15. In step S15, the CPU 91 determines whether learning for an engagement element operated from the disengaged state to the engaged state has converged. In a specific example, the CPU 91 acquires information on changes in the learning correction value CVL in the previous learning control for the target engagement element. The CPU 91 determines that learning for the target engagement element has converged when the learning correction value CVL has never been changed in the learning control from the present learning control until the time before a prescribed number of times determined in advance. The memory 94 stores information on changes in the learning correction value CVL in the learning control from the present learning control until the time before the prescribed number of times determined in advance. When it is determined in step S15 that learning has converged for an engagement element operated from the disengaged state to the engaged state (S15: YES), the CPU 91 proceeds to the process in step S16. Thus, in the present embodiment, it is determined that learning has converged when there is a low possibility that the learning correction value CVL for the target engagement element is changed even if the process in step S21, that is, learning in the learning process, is repeatedly performed thereafter, and the process proceeds to step S16 when it is determined that learning has converged.

In step S16, the CPU 91 turns on a learning convergence flag FL which indicates that learning for an engagement element operated from the disengaged state to the engaged state has converged. That is, when learning in the learning process has converged, the learning convergence flag FL is turned ON. After that, the CPU 91 repeatedly performs the processes in and after step S11. The initial value of the learning convergence flag FL for the target engagement element at the time when the process in step S21 has not been performed yet is OFF.

When it is determined in step S15 that learning has not converged for an engagement element operated from the disengaged state to the engaged state (S15: NO), on the other hand, the CPU 91 proceeds to the process in step S17.

In step S17, the CPU 91 turns OFF the learning convergence flag FL for an engagement element operated from the disengaged state to the engaged state. After that, the CPU 91 repeatedly performs the processes in and after step S11.

Next, evaluation control in which the CPU 91 evaluates the automatic transmission 30 will be described. The CPU 91 executes the evaluation control once each time shifting of the automatic transmission 30 is finished. The ROM 93 stores in advance an evaluation program which is a program for the evaluation control. The CPU 91 performs the evaluation control by executing the evaluation program stored in the ROM 93.

Figure 4:
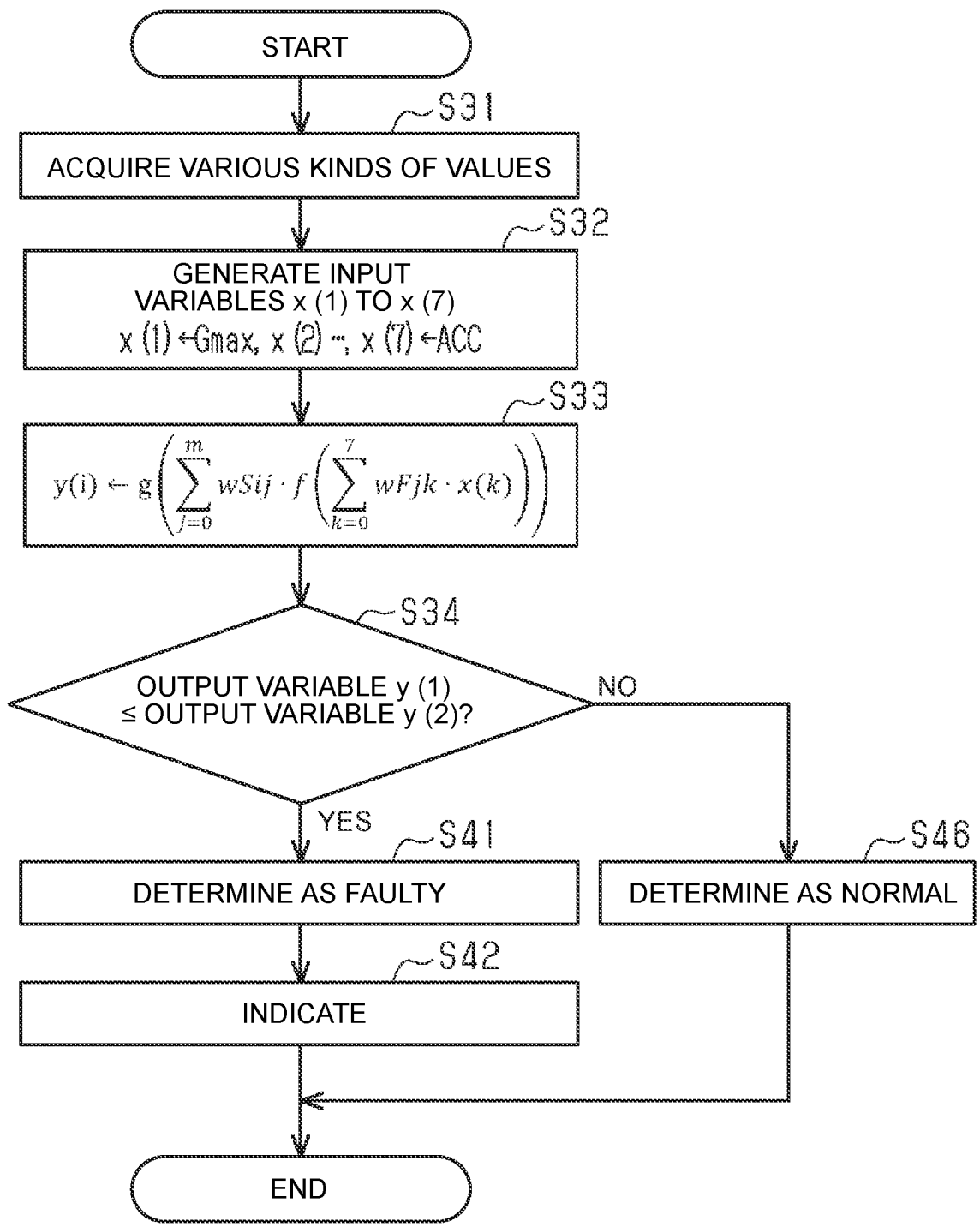
FIG. 4 is a flowchart illustrating evaluation control according to the embodiment.

As illustrated in FIG. 4, when the evaluation control is started, the CPU 91 acquires various kinds of values by accessing the memory 94 in step S31. Specifically, the CPU 91 acquires the front-rear acceleration G1 for a period from the start of shifting of the automatic transmission 30 until the end of the shifting of the automatic transmission 30 in shifting of the automatic transmission 30 which was finished immediately before the evaluation control. The CPU 91 calculates the maximum value of the amount of variations in the front-rear acceleration G1 per unit time based on the acquired front-rear acceleration G1. The CPU 91 acquires the maximum value of the amount of variations in the front-rear acceleration G1 per unit time as a maximum variation amount Gmax. As discussed above, the engine rotational speed NE temporarily becomes high when the value of torque that can be transferred is temporarily small compared to the value of torque desired to be transferred during shifting of the automatic transmission 30. A shifting shock is occasionally caused because of a temporary rise in the engine rotational speed NE. Thus, the CPU 91 acquires, as a value that indicates the magnitude of the shifting shock, the maximum value of the amount of variations in the front-rear acceleration G1 per unit time during shifting of the automatic transmission 30 which was finished immediately before the evaluation control as the maximum variation amount Gmax. The memory 94 stores the front-rear acceleration G1 which was detected during shifting of the automatic transmission 30 which was finished immediately before the evaluation control.

The CPU 91 acquires the learning convergence flag FL for an engagement element operated from the disengaged state to the engaged state during shifting of the automatic transmission 30 which was finished immediately before the evaluation control. The memory 94 stores the learning convergence flag FL for each engagement element.

The CPU 91 acquires, as the number of times of execution NL of the learning process, the number of times of execution of step S21 in the learning control for an engagement element operated from the disengaged state to the engaged state during shifting of the automatic transmission 30 which was finished immediately before the evaluation control. The number of times of execution NL is the number since the automatic transmission 30 was mounted on the vehicle 100 during manufacture of the vehicle 100 until the time when step S31 is performed. The memory 94 stores the number of times of execution NL for each engagement element. The number of times of execution NL is reset when the automatic transmission 30 is replaced during maintenance etc. of the automatic transmission 30, for example. In this case, the automatic transmission 30 is considered to be mounted on the vehicle 100 when a new automatic transmission 30 is mounted for replacement of the automatic transmission 30.

The CPU 91 acquires the learning correction value CVL for an engagement element operated from the disengaged state to the engaged state during shifting of the automatic transmission 30 which was finished immediately before the evaluation control. The memory 94 stores the learning correction value CVL for each engagement element.

The CPU 91 acquires a type of shifting TL which indicates the type of gear stages before and after shifting of the automatic transmission 30 which was finished immediately before the evaluation control. When the gear stage of the automatic transmission 30 is changed from second gear to third gear during shifting of the automatic transmission 30, for example, the type of shifting TL indicates shifting from second gear to third gear. The memory 94 stores the type of shifting TL during shifting of the automatic transmission 30 which was finished immediately before the evaluation control.

The CPU 91 acquires the number of times of engagement EN which is the number of times of engagement made by an engagement element operated from the disengaged state to the engaged state during shifting of the automatic transmission 30 which was finished immediately before the evaluation control. The number of times of engagement EN will be described using the number of times of engagement EN of the second clutch C2 as an example. When the gear stage of the automatic transmission 30 is changed from second gear to third gear after the shift stage of the automatic transmission 30 is changed from first gear to second gear, for example, the number of times of shifting made in the automatic transmission 30 is two. However, the second clutch C2 is only operated from the disengaged state to the engaged state when the gear stage of the automatic transmission 30 is changed from second gear to third gear. Therefore, the number of times of engagement EN of the second clutch C2 is incremented by one when the gear stage of the automatic transmission 30 is changed from second gear to third gear.

The number of times of engagement EN is the number since the automatic transmission 30 was mounted on the vehicle 100 during manufacture of the vehicle 100 until the time when step S31 is performed. The memory 94 stores the number of times of engagement EN for each engagement element. The number of times of engagement EN is reset when the automatic transmission 30 is replaced during maintenance etc. of the automatic transmission 30, for example. In this case, the automatic transmission 30 is considered to be mounted on the vehicle 100 when a new automatic transmission 30 is mounted for replacement of the automatic transmission 30.

The CPU 91 acquires the accelerator operation amount ACC at the time with the maximum variation amount Gmax during shifting of the automatic transmission 30 which was finished immediately before the evaluation control. The memory 94 stores the accelerator operation amount ACC which was detected during shifting of the automatic transmission 30 which was finished immediately before the evaluation control, in correlation with the front-rear acceleration G1. The process in step S31 is the acquisition process. After that, the CPU 91 proceeds to the process in step S32.

In step S32, the CPU 91 generates input variables x (1) to x (7) for mapping for evaluating the presence or absence of a fault of the automatic transmission 30, and substitutes the various values acquired in the process in step S31 into the input variables x (1) to x (7).

Specifically, the CPU 91 substitutes the maximum variation amount Gmax into the input variable x (1). The CPU 91 substitutes the learning convergence flag FL into the input variable x (2). A value of "1" is substituted into the input variable x (2) when the learning convergence flag FL is ON, while a value of "0" is substituted into the input variable x (2) when the learning convergence flag FL is OFF. That is, a value of "1" is substituted into the input variable x (2) as a first value for a case where learning in the learning process has converged, while a value of "0" is substituted into the input variable x (2) as a second value, which is different from the first value, for a case where learning in the learning process has not converged.

The CPU 91 substitutes the number of times of execution NL into the input variable x (3). The CPU 91 substitutes the learning correction value CVL into the input variable x (4). The CPU 91 substitutes the type of shifting TL into the input variable x (5). A numerical value determined in advance in accordance with the type of shifting TL is substituted into the input variable x (5). When the gear stage of the automatic transmission 30 is changed from second gear to third gear, for example, a value of "23" is substituted into the input variable x (5) as a numerical value for a type that indicates shifting from second gear to third gear.

The CPU 91 substitutes the number of engagements EN into the input variable x (6). The CPU 91 substitutes the accelerator operation amount ACC into the input variable x (7). After that, the CPU 91 proceeds to the process in step S33.

In the present embodiment, the input variable x (1) is an acceleration variable which is a variable that indicates the acceleration of the vehicle 100 during shifting of the automatic transmission 30. The input variable x (2) is a first learning progress variable which is a variable that indicates the status of progress of learning in the learning process. The input variable x (3) is a second learning progress variable which is a variable that indicates the status of progress of learning in the learning process. The input variable x (5) is a shifting type variable which indicates the type of gear stages before and after shifting of the automatic transmission 30. The input variable x (6) is a variable indicating the number of times of engagement which indicates the number of times of engagement made by an engagement element that is engaged to establish a gear stage after shifting of the automatic transmission 30. The input variable x (7) is an acceleration variable which indicates the accelerator operation amount ACC during shifting of the automatic transmission 30.

In step S33, the CPU 91 calculates the value of an output variable y (i) by inputting the input variables x (1) to x (7) generated in the process in step S32 and an input variable x (0) as a bias parameter to mapping M which is prescribed by mapping data 94A which are stored in advance in the memory 94. After that, the CPU 91 proceeds to the process in step S34.

Examples of the mapping M which is prescribed by the mapping data 94A include a function approximator, and a fully-connected forward-propagation neural network with a single intermediate layer. Specifically, in the mapping M which is prescribed by the mapping data 94A, the values of nodes in the intermediate layer are determined by substituting, into an activation function f, each of "m" values obtained by converting the input variables x (1) to x (7) and the input variable x (0) as a bias parameter using linear mapping prescribed by a coefficient wFjk (j=1 to m, k=0 to 7). In addition, output variables y (1) to y (2) are determined by substituting, into an activation function g, each of values obtained by converting the values of nodes in the intermediate layer using linear mapping prescribed by a coefficient wSij (i=1 to 2). The output variable y (1) is a variable that indicates the possibility that the automatic transmission 30 is normal. The output variable y (2) is a variable that indicates the possibility that the automatic transmission 30 has a fault. In the present embodiment, the output variable y (1) and the output variable y (2) are evaluation values that indicate the presence or absence of a fault of the automatic transmission 30. The processes in step S32 and step S33 are the calculation process. In the present embodiment, examples of the activation function f include a Rectified Liner Unit (ReLU) function. Examples of the activation function g include a soft-max function. Thus, the sum of the output variable y (1) and the output variable y (2) is "1".

The mapping M which is prescribed by the mapping data 94A is generated as follows, for example. First, various kinds of values about the automatic transmission 30 at the time when a shifting shock is caused are collected by causing a prototype vehicle on which a normal automatic transmission 30 is mounted to travel in various states, etc., before product shipment of the vehicle 100. In addition, various kinds of values about the automatic transmission 30 at the time when a shifting shock is caused are collected by causing a prototype vehicle on which a faulty automatic transmission 30 is mounted to travel in various states, etc., before product shipment of the vehicle 100. Then, the mapping M which has been trained is generated by learning using, as teacher data, the various kinds of values collected for the normal automatic transmission 30 and the various kinds of values collected for the faulty automatic transmission 30.

In step S34, the CPU 91 determines whether the output variable y (1) is equal to or less than the output variable y (2). When it is determined in step S34 that the output variable y (1) is equal to or less than the output variable y (2) (S34: YES), the CPU 91 proceeds to the process in step S41.

In step S41, the CPU 91 determines that the automatic transmission 30 has a fault. After that, the CPU 91 proceeds to the process in step S42. In step S42, the CPU 91 outputs, to the indication unit 76, a signal for causing the indication unit 76 to indicate that the automatic transmission 30 has a fault. After that, the CPU 91 finishes the current evaluation control.

When it is determined in step S34 that the output variable y (1) is not equal to or less than the output variable y (2) (S34: NO), on the other hand, the CPU 91 proceeds to the process in step S46. In step S46, the CPU 91 determines that the automatic transmission 30 is normal. After that, the CPU 91 finishes the current evaluation control.

The functions and the effects of the present embodiment will be described.

(1) The magnitude of a shifting shock in the automatic transmission 30 varies in accordance with not only the presence or absence of a fault of the automatic transmission 30 but also the status of progress of the learning process. Specifically, in the vehicle 100, the shifting shock in the automatic transmission 30 becomes smaller as the learning process is repeatedly performed. Therefore, the shifting shock in the automatic transmission 30 is relatively large when the learning process has not fully progressed yet, such as immediately after product shipment of the vehicle 100, for example. Thus, the automatic transmission 30 may be evaluated as faulty, even if the automatic transmission 30 is not faulty, when the presence or absence of a fault of the automatic transmission 30 is simply evaluated based on only the acceleration of the vehicle 100.

In the present embodiment, in this respect, the mapping M which is prescribed by the mapping data 94A outputs an evaluation value that indicates the presence or absence of a fault of the automatic transmission 30 in consideration of not only the maximum variation amount Gmax but also a value that indicates the status of progress of the learning process. Thus, it is possible to suppress the automatic transmission 30 being evaluated as faulty even if the maximum variation amount Gmax has become large when the learning process has not fully progressed yet, such as immediately after product shipment of the vehicle 100, for example. That is, in the present embodiment, the presence or absence of a fault of the automatic transmission 30 can be evaluated accurately irrespective of the status of progress of the learning process.

(2) The mapping M which is prescribed by the mapping data 94A outputs an evaluation value that indicates the presence or absence of a fault of the automatic transmission 30 in consideration of the learning convergence flag FL which indicates whether learning has converged. Therefore, it is possible to obtain an evaluation value determined in consideration of whether the maximum variation amount Gmax during shifting is relatively large even if learning has converged or the maximum variation amount Gmax during shifting is relatively large because learning has not converged, even if the maximum variation amount Gmax is the same. Thus, the presence or absence of a fault of the automatic transmission 30 can be evaluated accurately compared to a configuration in which the learning convergence flag FL is not taken into consideration.

(3) In the vehicle 100, learning converges as the learning process is repeatedly performed. Therefore, the degree of progress of learning in the learning process tends to vary in accordance with the number of times of execution NL of the learning process, even if the learning convergence flag FL is OFF.

In this respect, the number of times of execution NL which is strongly correlated with the degree of progress of learning in the learning process is input as an input variable to the mapping M which is prescribed by the mapping data 94A. Therefore, an evaluation value that accurately reflects the degree of progress of the learning process can be obtained.

(4) The absolute value of the learning correction value CVL tends to become large as degradation of the automatic transmission 30 progresses. Thus, the learning correction value CVL which is a value that may reflect degradation of the automatic transmission 30 is input as an input variable to the mapping M which is prescribed by the mapping data 94A. Consequently, the presence or absence of a fault of the automatic transmission 30 can be evaluated accurately by reflecting degradation of the automatic transmission 30.

(5) In the vehicle 100, the shifting shock during shifting of the automatic transmission 30 differs in accordance with the type of shifting TL. Therefore, the magnitude of the shifting shock which is used as a criterion for determination as to whether the automatic transmission 30 is normal or faulty also differs for each type of shifting TL. In this respect, the type of shifting TL is input as an input variable to the mapping M which is prescribed by the mapping data 94A. Consequently, the presence or absence of a fault of the automatic transmission 30 can be evaluated accurately in accordance with the type of shifting TL compared to a configuration in which the type of shifting TL is not taken into consideration.

(6) In the vehicle 100, an engagement element is worn each time the engagement element is engaged during shifting of the automatic transmission 30. The timing when the engagement element is engaged may deviate as the engagement element is worn. When the timing of engagement of the engagement element deviates in this manner, a shifting shock caused during shifting of the automatic transmission 30 due to such deviation may become large.

In the present embodiment, the number of times of engagement EN is input as an input variable to the mapping M which is prescribed by the mapping data 94A. That is, the number of times of engagement EN of an engagement element operated from the disengaged state to the engaged state during shifting of the automatic transmission 30, which is a value strongly correlated with the degree of wear of the engagement element, is input as an input variable. The presence or absence of a fault of the automatic transmission 30 may be evaluated accurately by inputting a value that may reflect the degree of wear of the engagement element in this manner, compared to a configuration in which the degree of wear of the engagement element is not reflected.

(7) A force input from the internal combustion engine 10, the first motor/generator 61, and the second motor/generator 62 to the automatic transmission 30 tends to be large as the accelerator operation amount ACC is large. A force to be transferred by an engagement element operated from the disengaged state to the engaged state is large as a force input to the automatic transmission 30 during shifting of the automatic transmission 30 is large. Therefore, the shifting shock in the automatic transmission 30, that is, the maximum variation amount Gmax, differs, depending on the accelerator operation amount ACC, even if conditions such as the type of shifting TL are the same, for example.

In this respect, the accelerator operation amount ACC is input as an input variable to the mapping M which is prescribed by the mapping data 94A. Consequently, it is possible to obtain an evaluation value that reflects the accelerator operation amount ACC which is correlated with the maximum variation amount Gmax.

Second Embodiment

Figure 5:
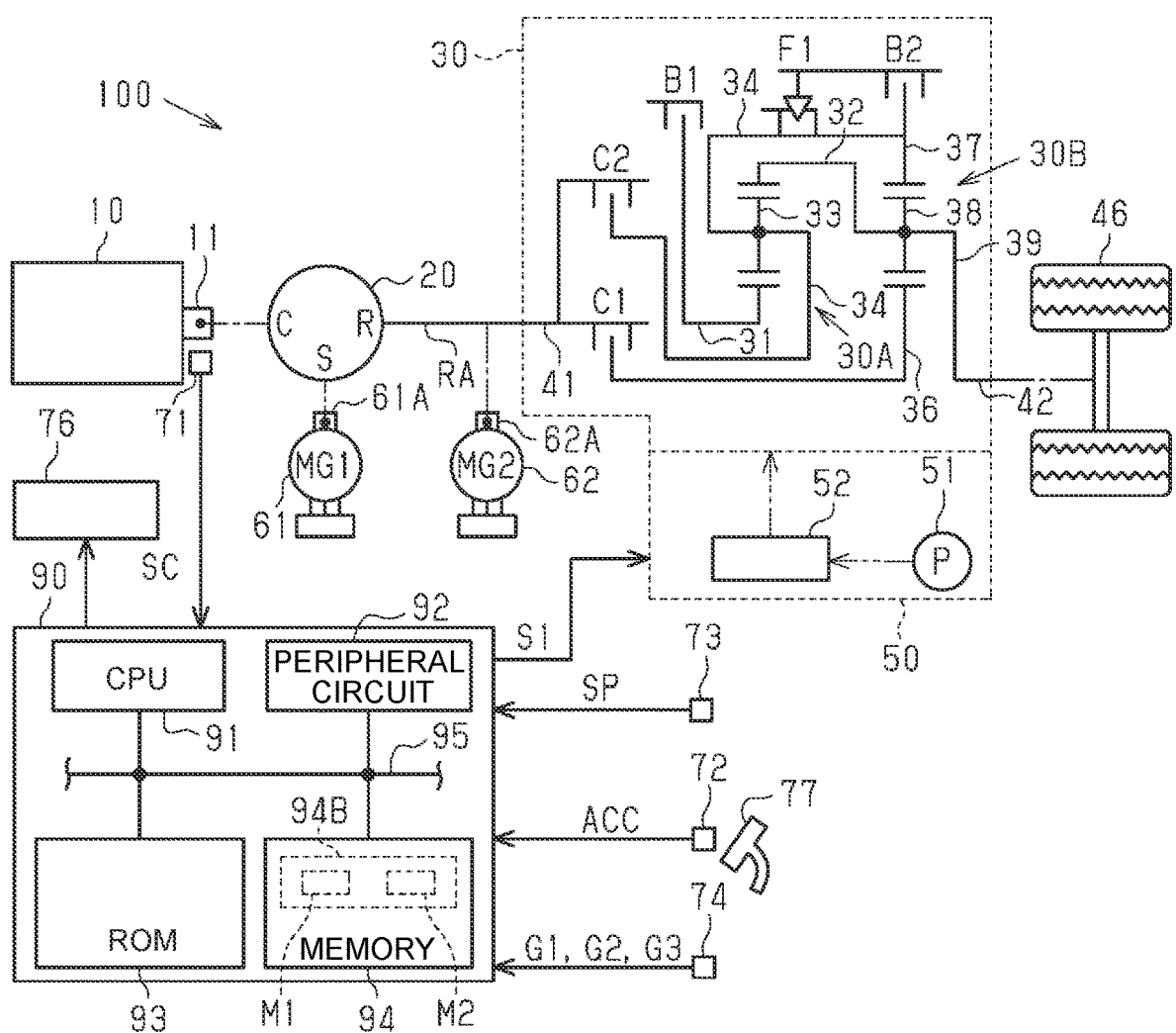
FIG. 5 is a schematic diagram of a vehicle according to a second embodiment.

A second embodiment of the present disclosure will be described below with reference to FIGS. 5 and 6. As illustrated in FIG. 5, the second embodiment differs in that the memory 94 stores in advance mapping data 94B in place of the mapping data 94A. Two types of mapping, namely first mapping M1 and second mapping M2, are prescribed in the mapping data 94B as mapping for evaluating the presence or absence of a fault of the automatic transmission 30. The second embodiment also differs in the evaluation control. The CPU 91 executes the evaluation control once each time shifting of the automatic transmission 30 is finished. The ROM 93 stores in advance an evaluation program which is a program for the evaluation control. The CPU 91 performs the evaluation control by executing the evaluation program stored in the ROM 93. Differences of the second embodiment from the first embodiment will be described mainly. Components according to the second embodiment that are similar to those according to the first embodiment are given identical signs to omit or simplify description thereof.

Figure 6:
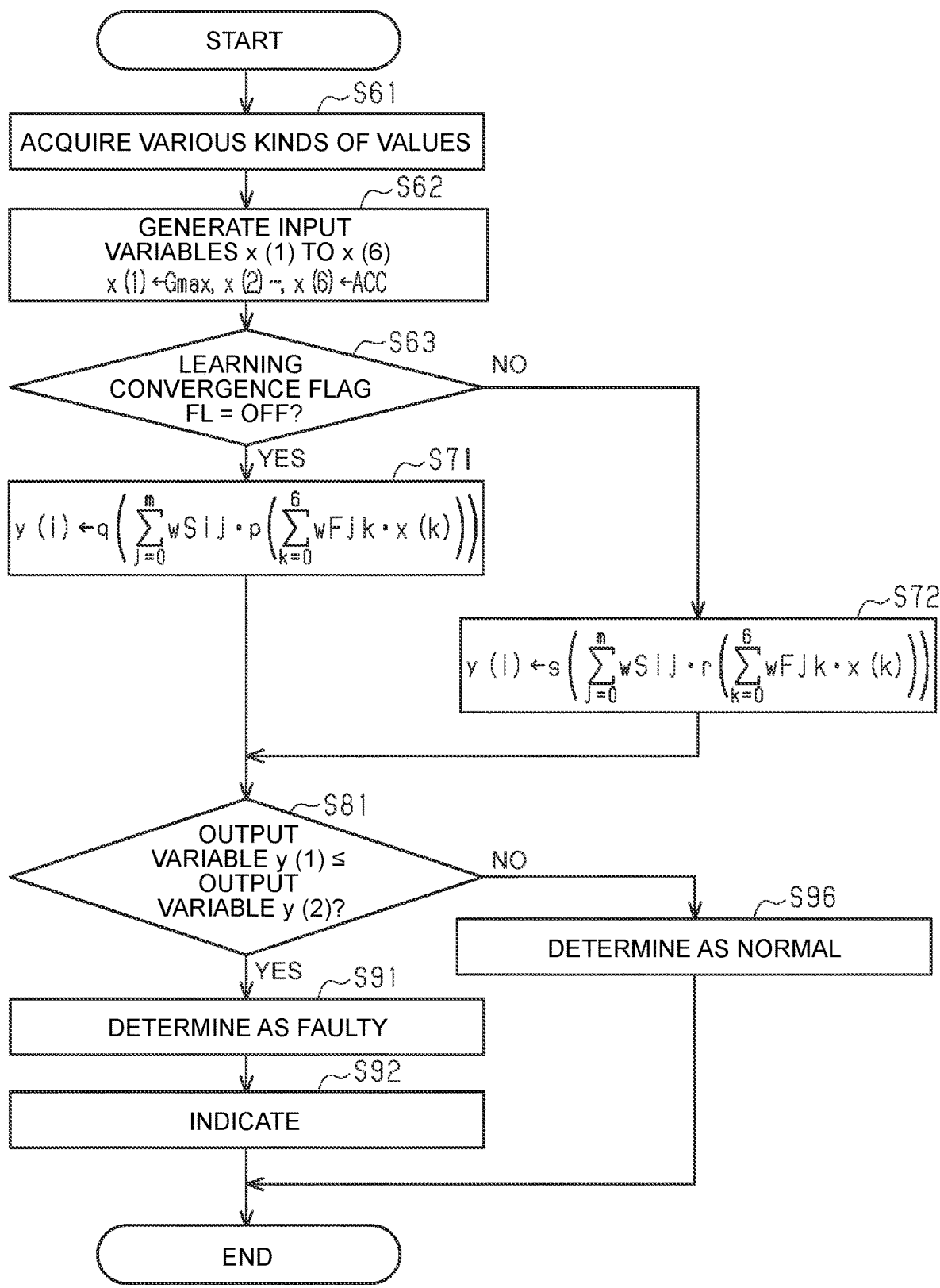
FIG. 6 is a flowchart illustrating evaluation control according to the embodiment.

As illustrated in FIG. 6, when the evaluation control is started, the CPU 91 acquires various kinds of values by accessing the memory 94 in step S61. The process in step S61 is the same as the process in step S31. After that, the CPU 91 proceeds to the process in step S62.

In step S62, the CPU 91 generates input variables x (1) to x (6) for mapping for evaluating the presence or absence of a fault of the automatic transmission 30, and substitutes the various values acquired in the process in step S61 into the input variables x (1) to x (6).

Specifically, the CPU 91 substitutes the maximum variation amount Gmax into the input variable x (1). The CPU 91 substitutes the number of times of execution NL into the input variable x (2). The CPU 91 substitutes the learning correction value CVL into the input variable x (3). The CPU 91 substitutes the type of shifting TL into the input variable x (4). The CPU 91 substitutes the number of times of engagement EN into the input variable x (5). The CPU 91 substitutes the accelerator operation amount ACC into the input variable x (6). After that, the CPU 91 proceeds to the process in step S63.

In the present embodiment, the input variable x (1) is an acceleration variable which is a variable that indicates the acceleration of the vehicle 100 during shifting of the automatic transmission 30. The input variable x (2) is a learning progress variable which is a variable that indicates the status of progress of learning in the learning process. The input variable x (4) is a shifting type variable which indicates the type of gear stages before and after shifting of the automatic transmission 30. The input variable x (5) is a variable indicating the number of times of engagement which indicates the number of times of engagement made by an engagement element that is engaged to establish a gear stage after shifting of the automatic transmission 30. The input variable x (6) is an acceleration variable which indicates the accelerator operation amount ACC during shifting of the automatic transmission 30.

In step S63, the CPU 91 determines whether the learning convergence flag FL is OFF. The learning convergence flag FL is a learning progress variable which is a variable that indicates the status of progress of learning in the learning process. A case where the learning convergence flag FL is OFF corresponds to the learning progress variable being within the first range. A case where the learning convergence flag FL is ON corresponds to the learning progress variable being within the second range. When it is determined in step S63 that the learning convergence flag FL is OFF (S63: YES), the CPU 91 proceeds to the process in step S71.

In step S71, the CPU 91 calculates the value of an output variable y (i) by inputting the input variables x (1) to x (6) generated in the process in step S62 and an input variable x (0) as a bias parameter to the first mapping M1 prescribed by the mapping data 94B which are stored in advance in the memory 94. After that, the CPU 91 proceeds to the process in step S81.

Examples of the first mapping M1 which is prescribed by the mapping data 94B include a function approximator, and a fully-connected forward-propagation neural network with a single intermediate layer. Specifically, in the first mapping M1 which is prescribed by the mapping data 94B, the values of nodes in the intermediate layer are determined by substituting, into an activation function p, each of "m" values obtained by converting the input variables x (1) to x (6) and the input variable x (0) as a bias parameter using linear mapping prescribed by a coefficient wFjk (j=1 to m, k=0 to 6). In addition, output variables y (1) to y (2) are determined by substituting, into an activation function q, each of values obtained by converting the values of nodes in the intermediate layer using linear mapping prescribed by a coefficient wSij (i=1 to 2). The output variable y (1) is a variable that indicates the possibility that the automatic transmission 30 is normal. The output variable y (2) is a variable that indicates the possibility that the automatic transmission 30 has a fault. In the present embodiment, the output variable y (1) and the output variable y (2) are evaluation values that indicate the presence or absence of a fault of the automatic transmission 30. In this case, the processes in step S62 and step S71 are the first calculation process. In the present embodiment, examples of the activation function p include a ReLU function. Examples of the activation function q include a soft-max function. Thus, the sum of the output variable y (1) and the output variable y (2) is "1".

The first mapping M1 which is prescribed by the mapping data 94B is generated as follows, for example. First, various kinds of values about the automatic transmission 30 at the time when a shifting shock is caused are collected by causing a prototype vehicle on which a normal automatic transmission 30 is mounted to travel in various states, etc., before product shipment of the vehicle 100. In addition, various kinds of values about the automatic transmission 30 at the time when a shifting shock is caused are collected by causing a prototype vehicle on which a faulty automatic transmission 30 is mounted to travel in various states, etc., before product shipment of the vehicle 100. Then, the first mapping M1 which has been trained is generated by learning using, as teacher data, values for a case where the learning convergence flag FL is OFF, among the various kinds of values collected for the normal automatic transmission 30, and values for a case where the learning convergence flag FL is OFF, among the various kinds of values collected for the faulty automatic transmission 30.

When it is determined in step S63 that the learning convergence flag FL is ON (S63: NO), on the other hand, the CPU 91 proceeds to the process in step S72. In step S72, the CPU 91 calculates the value of an output variable y (i) by inputting the input variables x (1) to x (6) generated in the process in step S62 and an input variable x (0) as a bias parameter to the second mapping M2 which is prescribed by the mapping data 94B which are stored in advance in the memory 94. After that, the CPU 91 proceeds to the process in step S81.

Examples of the second mapping M2 which is prescribed by the mapping data 94B include a function approximator, and a fully-connected forward-propagation neural network with a single intermediate layer. Specifically, in the second mapping M2 which is prescribed by the mapping data 94B, the values of nodes in the intermediate layer are determined by substituting, into an activation function r, each of "m" values obtained by converting the input variables x (1) to x (6) and the input variable x (0) as a bias parameter using linear mapping prescribed by a coefficient wFjk (j=1 to m, k=0 to 6). In addition, output variables y (1) to y (2) are determined by substituting, into an activation function s, each of values obtained by converting the values of nodes in the intermediate layer using linear mapping prescribed by a coefficient wSij (i=1 to 2). The output variable y (1) is a variable that indicates the possibility that the automatic transmission 30 is normal. The output variable y (2) is a variable that indicates the possibility that the automatic transmission 30 has a fault. In the present embodiment, the output variable y (1) and the output variable y (2) are evaluation values that indicate the presence or absence of a fault of the automatic transmission 30. In this case, the processes in step S62 and step S72 are the second calculation process. In the present embodiment, examples of the activation function r include a ReLU function. Examples of the activation function s include a soft-max function. Thus, the sum of the output variable y (1) and the output variable y (2) is "1".

The second mapping M2 which is prescribed by the mapping data 94B is generated as follows, for example. First, various kinds of values about the automatic transmission 30 at the time when a shifting shock is caused are collected by causing a prototype vehicle on which a normal automatic transmission 30 is mounted to travel in various states, etc., before product shipment of the vehicle 100. In addition, various kinds of values about the automatic transmission 30 at the time when a shifting shock is caused are collected by causing a prototype vehicle on which a faulty automatic transmission 30 is mounted to travel in various states, etc., before product shipment of the vehicle 100. Then, the second mapping M2 which has been trained is generated by learning using, as teacher data, values for a case where the learning convergence flag FL is ON, among the various kinds of values collected for the normal automatic transmission 30, and values for a case where the learning convergence flag FL is ON, among the various kinds of values collected for the faulty automatic transmission 30.

In step S81, the CPU 91 determines whether the output variable y (1) is equal to or less than the output variable y (2). When it is determined in step S81 that the output variable y (1) is equal to or less than the output variable y (2) (S81: YES), the CPU 91 proceeds to the process in step S91.

In step S91, the CPU 91 determines that the automatic transmission 30 has a fault. After that, the CPU 91 proceeds to the process in step S92. In step S92, the CPU 91 outputs, to the indication unit 76, a signal for causing the indication unit 76 to indicate that the automatic transmission 30 has a fault. After that, the CPU 91 finishes the current evaluation control.

When it is determined in step S81 that the output variable y (1) is not equal to or less than the output variable y (2) (S81: NO), on the other hand, the CPU 91 proceeds to the process in step S96. In step S96, the CPU 91 determines that the automatic transmission 30 is normal. After that, the CPU 91 finishes the current evaluation control.

The functions and the effects of the present embodiment will be described. In the present embodiment, the following effect (8) is obtained in addition to the effects (3) to (7) described above.

(8) Characteristics such as how the presence or absence of a fault affects a shifting shock during shifting of the automatic transmission 30 may vary significantly depending on whether learning in the learning process has converged or not. When evaluating the presence or absence of a fault in this manner, the accuracy of the entire mapping may not be secured if it is attempted to obtain an evaluation value using the same mapping even if the characteristics differ significantly depending on the status of progress of the learning process.

In the present embodiment, the first mapping M1 is used when the learning convergence flag FL is OFF, while the second mapping M2 is used when the learning convergence flag FL is ON. That is, one of the first mapping M1 and the second mapping M2 is selectively used in accordance with the learning convergence flag FL which serves as a learning progress variable which is a variable that indicates the status of progress of learning in the learning process. Consequently, an appropriate value can be output as an output variable which is an evaluation value that indicates the presence or absence of a fault of the automatic transmission 30, whether learning in the learning process has converged or not. Thus, it is possible to suppress the automatic transmission 30 being evaluated as faulty even if the maximum variation amount Gmax has become large when the learning process has not fully progressed yet, such as immediately after product shipment of the vehicle 100, for example. That is, in the present embodiment, the presence or absence of a fault of the automatic transmission 30 can be evaluated accurately irrespective of the status of progress of the learning process.

Other Embodiments

The present embodiment may be modified as follows. The present embodiment and the following modifications can be combined with each other unless such an embodiment and modifications technically contradict with each other.

Acceleration Variable

In the first embodiment and the second embodiment described above, the acceleration variable to be input to the mapping is not limited to that according to the above embodiments. For example, the up-down acceleration G3 tends to vary in accordance with the magnitude of a shifting shock in the automatic transmission 30. Therefore, the maximum value of the amount of variations in the up-down acceleration G3 per unit time during shifting of the automatic transmission 30 may be adopted as the acceleration variable to be input to the mapping, in place of or in addition to the maximum variation amount Gmax which is the amount of variations in the front-rear acceleration G1 per unit time during shifting of the automatic transmission 30.

If the number of vibrations generated in the vehicle 100 per unit time varies in accordance with the magnitude of a shifting shock in the automatic transmission 30, for example, the number of vibrations generated in the vehicle 100 per unit time may be adopted as the acceleration variable to be input to the mapping. The number of vibrations generated in the vehicle 100 per unit time may be acquired based on the front-rear acceleration G1 or the up-down acceleration G3. It is not always necessary to adopt all of the plurality of acceleration variables described above as the acceleration variable to be input to the mapping, and it is only necessary to adopt at least one of such variables.

The front-rear acceleration G1 itself, rather than the amount of variations in the front-rear acceleration G1 per unit time, may be input as an input variable. It can be estimated whether the vehicle is accelerating or decelerating during shifting if the accelerator operation amount ACC or the amount of operation of a brake pedal is input as an input variable, for example. Thus, the presence or absence of a fault of the automatic transmission 30 can be evaluated accurately also by using the front-rear acceleration G1 itself as an input variable. There is no problem that the front-rear acceleration G1 itself is input as an input variable as long as the series of processes is performed during uniform travel of the vehicle 100, even if a parameter that allows estimation as to whether the vehicle is accelerating or decelerating during shifting is not input as an input variable.

Learning Progress Variable

In the first embodiment and the second embodiment described above, the learning progress variable to be input to the mapping is not limited to that according to the above embodiments. For example, the status of progress of learning in the learning process has a tendency that the learning progresses more as the travel distance over which the vehicle 100 has traveled since the automatic transmission 30 was mounted on the vehicle 100 during manufacture of the vehicle 100 is longer. Therefore, the travel distance of the vehicle 100 may be adopted as the learning progress variable to be input to the mapping. With this configuration, the travel distance of the vehicle 100, which is a value strongly correlated with the degree of progress of the learning process, is input as an input variable. Consequently, an evaluation value that accurately reflects the progress of the learning process can be obtained. When the automatic transmission 30 is replaced during maintenance etc. of the automatic transmission 30, for example, the time when a new automatic transmission 30 is mounted for replacement of the automatic transmission 30 corresponds to the time when the automatic transmission 30 is mounted on the vehicle 100.

It is not always necessary to adopt all of the learning convergence flag FL, the number of times of execution NL, and the travel distance of the vehicle 100 as the learning progress variable to be input to the mapping, and it is only necessary to adopt at least one of such variables, for example.

In the second embodiment described above, the learning progress variable for determining the mapping to be used in the calculation process is not limited to that according to the second embodiment. For example, the number of times of execution NL may be adopted as the learning progress variable for determining the mapping to be used in the calculation process. In this case, in step S63, an affirmative determination may be made when the number of times of execution NL is equal to or less than the prescribed number of times of execution determined in advance, and a negative determination may be made when the number of times of execution NL is not equal to or less than the prescribed number of times of execution determined in advance.

Similarly, the travel distance over which the vehicle 100 has traveled since the automatic transmission 30 was mounted on the vehicle 100 during manufacture of the vehicle 100 may be adopted as the learning progress variable for determining the mapping which is used in the calculation process.

In the second embodiment described above, not only two types of mapping but also three or more types of mapping may be used selectively in accordance with the status of progress of learning when the number of times of execution NL or the travel distance of the vehicle 100 is adopted as the learning progress variable for determining the mapping to be used in the calculation process. Specifically, in a configuration in which the learning progress variable is the number of times of execution NL, first mapping may be used when the number of times of execution NL is equal to or less than the first prescribed number of times of execution, second mapping may be used when the number of times of execution NL is larger than the first prescribed number of times of execution and equal to or less than the second prescribed number of times of execution which is larger than the first prescribed number of times of execution, and third mapping may be used when the number of times of execution NL is larger than the second prescribed number of times of execution.

In a configuration in which the learning progress variable is used in order to determine the mapping to be used in the calculation process, it is not always necessary to input the learning progress variable as an input variable to the mapping. With this configuration, the presence or absence of a fault of the automatic transmission 30 can be evaluated in consideration of the status of progress of the learning process, by using two or more types of mapping selectively in accordance with the status of progress of learning.

Other Input Variables

In the first embodiment and the second embodiment described above, the input variables to be input to the mapping are not limited to those according to the above embodiments. For example, the degree of wear of an engagement element of the automatic transmission 30 tends to become larger as the number of times of shifting made since the automatic transmission 30 is mounted on the vehicle 100 during manufacture of the vehicle 100 becomes larger. Therefore, the number of times of shifting to a gear stage after shifting of the automatic transmission 30 may be adopted as an input variable to be input to the mapping. With this configuration, the number of times of shifting to a gear stage after shifting of the automatic transmission 30, which is a value strongly correlated with the degree of wear of an engagement element of the automatic transmission 30, is input as an input variable. Consequently, an evaluation value that reflects the degree of wear of an engagement element of the automatic transmission 30 can be obtained.

It is not always necessary to adopt the type of shifting TL, the number of times of engagement EN, the accelerator operation amount ACC, and the number of times of shifting of the automatic transmission 30 as the input variables to be input to the mapping, and some of such variables may be omitted as appropriate, for example. That is, in a configuration in which the presence or absence of a fault of the automatic transmission 30 is determined using one type of mapping as in the first embodiment, it is only necessary that at least the acceleration variable and the learning progress variable should be included as the input variables to be input to the mapping. In a configuration in which the presence or absence of a fault of the automatic transmission 30 is determined using two or more types of mapping selectively based on the learning progress variable as in the second embodiment, meanwhile, it is only necessary that at least the acceleration variable should be included as the input variable to be input to the mapping.

Learning Process

In the first embodiment and the second embodiment described above, the learning process is not limited to that according to the above embodiments. For example, the target pressure Z may be calculated by multiplying the reference pressure ZA, which is determined in advance, by the learning correction value CVL. In this case, in step S21, the CPU 91 may calculate a new learning correction value CVL by adding a predetermined value determined in advance to the learning correction value CVL before the process in step S21. With this configuration, the initial value of the learning correction value CVL for the target engagement element at the time when the process in step S21 has not been performed yet is "1".

Output Variable

In the first embodiment and the second embodiment described above, the output variable of the mapping is not limited to that according to the above embodiments. For example, it is not always necessary to calculate two evaluation values, that is, a variable that indicates the possibility that the automatic transmission 30 is normal and a variable that indicates the possibility that the automatic transmission 30 has a fault, as the output variable of the mapping, and only a variable that indicates the possibility that the automatic transmission 30 has a fault may be calculated. In this case, the CPU 91 may determine that the automatic transmission 30 has a fault when it is determined that the variable that indicates the possibility that the automatic transmission 30 has a fault is equal to or more than a threshold determined in advance.

Mapping

In the first embodiment and the second embodiment described above, the activation functions of the mapping are exemplary, and are not limited to those according to the above embodiments. For example, a logistic sigmoid function etc. may be adopted as the activation functions of the mapping.

In the first embodiment and the second embodiment described above, a neural network with a single intermediate layer is indicated as an example of the neural network. However, the neural network may include two or more intermediate layers.

In the first embodiment and the second embodiment described above, a fully-connected forward-propagation neural network is indicated as an example of the neural network. However, the present disclosure is not limited thereto. For example, a recurrent neural network may be adopted as the neural network.

In the first embodiment and the second embodiment described above, the function approximator as the mapping is not limited to a neural network. For example, the function approximator may be a regression formula that does not include an intermediate layer.

Fault Evaluation Device

In the first embodiment and the second embodiment described above, the fault evaluation device is mounted on the vehicle 100. However, the present disclosure is not limited thereto. For example, the fault evaluation device may be installed at a dealer etc. that maintains the vehicle. In this case, the vehicle stores, in the memory 94, various kinds of values including at least the acceleration variable and the learning progress variable. The fault evaluation device which is installed at the dealer etc. acquires the various kinds of values stored in the memory 94 of the vehicle during maintenance etc. of the vehicle. The fault evaluation device may evaluate the presence or absence of a fault of the automatic transmission 30, by calculating an output variable by inputting the various kinds of values acquired to the mapping.

Processor

In the first embodiment and the second embodiment described above, the processor is not limited to a processor that includes the CPU 91 and the ROM 93 and that executes software processing. As a specific example, the processor may include a dedicated hardware circuit, such as an application-specific integrated circuit (ASIC), for example, that performs hardware processing for at least some of processes subjected to software processing in the embodiments described above. That is, the processor may have any of the following configurations (a) to (c). (a) The processor includes a processing device that executes all of the processes described above in accordance with a program and a program storage device, such as a ROM, that stores the program. (b) The processor includes a processing device that executes some of the processes described above in accordance with a program, a program storage device, and a dedicated hardware circuit that executes the remaining processes. (c) The processor includes a dedicated hardware circuit that executes all of the processes described above. The processor may include a plurality of software execution devices, which each include a processing device and a program storage device, or dedicated hardware circuits.

Vehicle

In the first embodiment and the second embodiment described above, the vehicle is a so-called series-parallel hybrid vehicle. However, the present disclosure is not limited thereto. For example, the vehicle may be a series hybrid vehicle or a parallel hybrid vehicle.

In the first embodiment and the second embodiment described above, the vehicle is also not limited to a vehicle that includes an internal combustion engine and a motor/generator. For example, the vehicle may be a vehicle that includes an internal combustion engine but that does not include a motor/generator. Further, the vehicle may be a vehicle that includes a motor/generator but that does not include an internal combustion engine, for example.

What is claimed is:

1. A fault evaluation device for an automatic transmission, the fault evaluation device evaluating a fault of the automatic transmission, and the fault evaluation device being used for a vehicle having the automatic transmission and a control device configured to execute a learning process for correcting a target pressure for oil to be supplied to the automatic transmission such that variations in acceleration of the vehicle during shifting of the automatic transmission are small, the fault evaluation device comprising:
a processor; and
a memory, wherein:
the memory stores mapping data that prescribe mapping;
the processor is configured to output an output variable, which is an evaluation value that indicates presence or absence of the fault of the automatic transmission, when an input variable is input;
the mapping includes, as the input variable, an acceleration variable, which is a variable that indicates the acceleration of the vehicle during shifting of the automatic transmission, and a learning progress variable, which is a variable that indicates a status of progress of learning in the learning process; and
the processor is configured to execute an acquisition process, which is a process to acquire the input variable, and a calculation process, which is a process to calculate a value of the output variable by inputting the input variable acquired through the acquisition process to the mapping.

2. The fault evaluation device according to claim 1, wherein the learning progress variable is a variable that takes a first value when the learning in the learning process has converged, and that takes a second value, which is different from the first value, when the learning in the learning process has not converged.

3. The fault evaluation device according to claim 1, wherein the learning progress variable is a variable that indicates the number of times of execution of the learning process since the automatic transmission was mounted on the vehicle.

4. The fault evaluation device according to claim 1, wherein the learning progress variable is a travel distance of the vehicle that has been traveled since the automatic transmission was mounted on the vehicle.

5. The fault evaluation device according to claim 1, wherein:
the target pressure is calculated by adding or multiplying a learning correction value and a reference pressure which is a pressure of oil at a time when the learning process has not been performed yet;
the learning process is a process to calculate the learning correction value such that the variations in the acceleration of the vehicle during shifting of the automatic transmission are small; and
the mapping includes the learning correction value as the input variable.

6. The fault evaluation device according to claim 1, wherein:
the automatic transmission includes a plurality of engagement elements and a plurality of gear stages operated by the engagement elements; and
the mapping includes, as the input variable, a shifting type variable which indicates a type of the gear stages before and after shifting of the automatic transmission.

7. The fault evaluation device according to claim 1, wherein:
the automatic transmission includes the engagement elements and the gear stages operated by the engagement elements; and
the mapping includes, as the input variable, a variable indicating the number of times of shifting which indicates the number of times of shifting made since the automatic transmission was mounted on the vehicle, the number of times of shifting being made to one of the gear stages after shifting of the automatic transmission.

8. The fault evaluation device according to claim 1, wherein:
the automatic transmission includes the engagement elements and the gear stages operated by the engagement elements; and
the mapping includes, as the input variable, a variable indicating the number of times of engagement which indicates the number of times of engagement made by the engagement elements since the automatic transmission was mounted on the vehicle, the number of times of engagement being made by an engagement element, among the engagement elements, that is engaged to establish one of the gear stages after shifting of the automatic transmission.

9. The fault evaluation device according to claim 1, wherein the mapping includes, as the input variable, an accelerator variable which indicates an amount of operation of an accelerator pedal during shifting of the automatic transmission.

10. A fault evaluation device for an automatic transmission, the fault evaluation device evaluating a fault of the automatic transmission, and the fault evaluation device being used for a vehicle having the automatic transmission and a control device configured to execute a learning process for correcting a target pressure for oil to be supplied to the automatic transmission such that variations in acceleration of the vehicle during shifting of the automatic transmission are small, the fault evaluation device comprising:
a processor; and
a memory, wherein:
the memory stores mapping data that prescribe first mapping and second mapping;
the processor is configured to output an output variable, which is an evaluation value that indicates presence or absence of the fault of the automatic transmission, when a plurality of input variables is input;
the first mapping and the second mapping include, as one of the input variables, an acceleration variable which is a variable that indicates the acceleration of the vehicle during shifting of the automatic transmission;
the first mapping is trained mapping that has been trained through machine learning on condition that a learning progress variable, which is a variable that indicates a status of progress of learning in the learning process, is within a first range;
the second mapping is trained mapping that has been trained through machine learning on condition that the learning progress variable is within a second range which is different from the first range; and
the processor is configured to execute an acquisition process, which is a process to acquire the input variables and the learning progress variable, a first calculation process to calculate a value of the output variable by inputting the input variables acquired through the acquisition process to the first mapping when the learning progress variable acquired through the acquisition process is within the first range, and a second calculation process to calculate the value of the output variable by inputting the input variables acquired through the acquisition process to the second mapping when the learning progress variable acquired through the acquisition process is within the second range.

11. A fault evaluation method for an automatic transmission, the fault evaluation method being used to evaluate a fault of the automatic transmission, and the fault evaluation method being used for a vehicle having the automatic transmission and a control device configured to execute a learning process for correcting a target pressure for oil to be supplied to the automatic transmission such that variations in acceleration of the vehicle during shifting of the automatic transmission are small, wherein:
the fault evaluation method is executed by a fault evaluation device;
the fault evaluation device includes a processor and a memory;
the memory stores mapping data that prescribe mapping; and
the processor is configured to output an output variable, which is an evaluation value that indicates presence or absence of the fault of the automatic transmission, when an input variable is input,
the fault evaluation method comprising calculating a value of the output variable by inputting, as the input variable, an acceleration variable, which is a variable that indicates the acceleration of the vehicle during shifting of the automatic transmission, and a learning progress variable, which is a variable that indicates a status of progress of learning in the learning process, to the fault evaluation device.

12. A fault evaluation method for an automatic transmission, the fault evaluation method being used to evaluate a fault of the automatic transmission, and the fault evaluation method being used for a vehicle having the automatic transmission and a control device configured to execute a learning process for correcting a target pressure for oil to be supplied to the automatic transmission such that variations in acceleration of the vehicle during shifting of the automatic transmission are small, wherein:
- the fault evaluation method is executed by a fault evaluation device;
- the fault evaluation device includes a processor and a memory;
- the memory stores mapping data that prescribe first mapping and second mapping;
- the processor is configured to output an output variable, which is an evaluation value that indicates presence or absence of the fault of the automatic transmission, when a plurality of input variables is input;
- the first mapping and the second mapping include, as one of the input variables, an acceleration variable which is a variable that indicates the acceleration of the vehicle during shifting of the automatic transmission;
- the first mapping is trained mapping that has been trained through machine learning on condition that a learning progress variable, which is a variable that indicates a status of progress of learning in the learning process, is within a first range; and
- the second mapping is trained mapping that has been trained through machine learning on condition that the learning progress variable is within a second range which is different from the first range,
- the fault evaluation method comprising:
  - inputting, as the input variables, the acceleration variable and the learning progress variable to the fault evaluation device; and
  - calculating a value of the output variable by inputting the input variables to the first mapping when the learning progress variable is within the first range, and calculating the value of the output variable by inputting the input variables to the second mapping when the learning progress variable is within the second range.

13. A non-transitory storage medium that stores a fault evaluation program for an automatic transmission, the fault evaluation program being configured to cause a computer to operate as a fault evaluation device that evaluates a fault of the automatic transmission, wherein:
- the fault evaluation program is used for a vehicle having the automatic transmission and a control device configured to execute a learning process for correcting a target pressure for oil to be supplied to the automatic transmission such that variations in acceleration of the vehicle during shifting of the automatic transmission are small;
- the fault evaluation program has mapping data that prescribe mapping;
- the mapping includes, as an input variable, an acceleration variable, which is a variable that indicates the acceleration of the vehicle during shifting of the automatic transmission, and a learning progress variable, which is a variable that indicates a status of progress of learning in the learning process; and
- the fault evaluation program is configured to cause the computer to execute a function to acquire the input variable and a function to calculate a value of an output variable, which is an evaluation value that indicates presence or absence of the fault of the automatic transmission, by inputting the acquired input variable to the mapping.

14. A non-transitory storage medium that stores a fault evaluation program for an automatic transmission, the fault evaluation program being configured to cause a computer to operate as a fault evaluation device that evaluates a fault of the automatic transmission, and the fault evaluation program being used for a vehicle having the automatic transmission and a control device configured to execute a learning process for correcting a target pressure for oil to be supplied to the automatic transmission such that variations in acceleration of the vehicle during shifting of the automatic transmission are small, wherein:
- the fault evaluation program has mapping data that prescribe first mapping and second mapping, the first mapping and the second mapping include, as one of a plurality of input variables, an acceleration variable which is a variable that indicates the acceleration of the vehicle during shifting of the automatic transmission;
- the first mapping is trained mapping that has been trained through machine learning on condition that a learning progress variable, which is a variable that indicates a status of progress of learning in the learning process, is within a first range;
- the second mapping is trained mapping that has been trained through machine learning on condition that the learning progress variable is within a second range which is different from the first range; and
- the fault evaluation program is configured to cause the computer to execute a function to acquire the input variables and the learning progress variable, a function to calculate a value of an output variable, which is an evaluation value that indicates presence or absence of the fault of the automatic transmission, by inputting the acquired input variables to the first mapping when the acquired learning progress variable is within the first range, and a function to calculate the value of the output variable by inputting the acquired input variables to the second mapping when the acquired learning progress variable is within the second range.

* * * * *